(12) United States Patent
Steininger et al.

(10) Patent No.: US 10,989,134 B2
(45) Date of Patent: Apr. 27, 2021

(54) METHOD FOR OPERATING A FUEL INJECTION SYSTEM OF A MOTOR VEHICLE AND FUEL INJECTION SYSTEM

(71) Applicants: HYUNDAI MOTOR COMPANY, Seoul (KR); KIA MOTORS CORPORATION, Seoul (KR)

(72) Inventors: Roland Steininger, Biblis (DE); Viktor Boschmann, Russelsheim (DE)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/359,105

(22) Filed: Mar. 20, 2019

(65) Prior Publication Data
US 2020/0191088 A1 Jun. 18, 2020

(30) Foreign Application Priority Data
Dec. 13, 2018 (DE) .......................... 102018221683.5

(51) Int. Cl.
*F02D 41/40* (2006.01)
*F02M 61/16* (2006.01)
(Continued)

(52) U.S. Cl.
CPC ......... *F02D 41/40* (2013.01); *F02D 41/3017* (2013.01); *F02M 57/005* (2013.01);
(Continued)

(58) Field of Classification Search
CPC ...... F02D 41/30; F02D 41/3017; F02D 41/40; F02M 57/00; F02M 57/005; F02M 61/16;
(Continued)

(56) References Cited

U.S. PATENT DOCUMENTS 4,020,802 A * 5/1977 Hattori ................... F02B 19/10
123/490
4,617,902 A * 10/1986 Hirano ................... F02D 41/14
123/479
(Continued)

FOREIGN PATENT DOCUMENTS

DE 10346220 A1 4/2005
DE 10 2017 209 836 A1 12/2018

*Primary Examiner* — John Kwon
*Assistant Examiner* — Johnny H Hoang
(74) *Attorney, Agent, or Firm* — Brinks Gilson & Lione (57) ABSTRACT

A method for operating a fuel injection system for a vehicle is provided. In particular, the fuel injection system includes an injection nozzle having a nozzle body, a nozzle orifice and a nozzle needle movable in the nozzle body. The method including: measuring an actual injection timing of the injection nozzle during injection based on an electrical signal generated by the nozzle needle through an electric contact with the nozzle body so that the electrical signal identifies an open state and a closed state of the injection nozzle; calculating a deviation of the actual injection timing from a scheduled injection timing of the fuel injection system; and controlling the injection nozzle by adjusting injection parameters of the injection nozzle based on the evaluated deviation.

11 Claims, 6 Drawing Sheets

(51) Int. Cl.
  *F02M 63/00* (2006.01)
  *F02D 41/30* (2006.01)
  *F02M 57/00* (2006.01)
  *F02M 65/00* (2006.01)

(52) U.S. Cl.
  CPC ...... *F02M 61/161* (2013.01); *F02M 63/0015* (2013.01); *F02M 63/0028* (2013.01); *F02M 65/005* (2013.01); *F02D 2200/0614* (2013.01); *F02D 2200/0618* (2013.01)

(58) Field of Classification Search
  CPC .. F02M 61/161; F02M 63/00; F02M 63/0015; F02M 63/0028; F02M 65/00; F02M 65/0065
  USPC .................. 701/102–105; 123/470–472, 478
  See application file for complete search history.

(56) References Cited

U.S. PATENT DOCUMENTS

| | | | |
|---|---|---|---|
| 5,794,860 A * | 8/1998 | Neumann | F02M 51/0653 239/585.3 |
| 7,043,350 B2 * | 5/2006 | Abe | F02D 41/3005 123/478 |
| 8,827,175 B2 * | 9/2014 | Fritsch | F02D 41/2096 123/478 |
| 2005/0060085 A1 * | 3/2005 | Radue | F02D 41/2432 701/103 |
| 2010/0186718 A1 * | 7/2010 | Klein | F02D 41/2432 123/472 |
| 2010/0250095 A1 * | 9/2010 | Yamada | F02D 41/3809 701/103 |
| 2011/0213544 A1 * | 9/2011 | Mitsuda | F02D 41/2467 701/103 |
| 2012/0136555 A1 * | 5/2012 | Okamoto | F02D 41/047 701/104 |
| 2016/0017836 A1 * | 1/2016 | Tanaka | F02D 41/126 701/104 |

* cited by examiner

METHOD FOR OPERATING A FUEL INJECTION SYSTEM OF A MOTOR VEHICLE AND FUEL INJECTION SYSTEM

CROSS-REFERENCE TO RELATED APPLICATION

This application claims priority to and the benefit of German Patent Application No. 102018221683.5, filed on Dec. 13, 2018, the entire contents of which are incorporated herein by reference.

FIELD

The present disclosure pertains to a method for operating a fuel injection system of a motor vehicle, a fuel injection system, and a motor vehicle comprising a fuel injection system.

BACKGROUND

The statements in this section merely provide background information related to the present disclosure and may not constitute prior art.

Typically a performance of a diesel engine in terms of emission and combustion noise can be strongly influenced by a precision of a fuel injection metering of an engine management system operating one or several corresponding fuel injection nozzles. In particular, an accuracy of a small fuel injection quantity (e.g. smaller than two milligrams per stroke), a so-called pilot injection quantity, can be highly important.

In other words, a metering and timing achieved by a signal from a conventional electronic control module (ECM) and/or engine control unit (ECU) having a controlled beginning and a controlled period can be limited in its accuracy with respect to small injection quantities.

Furthermore, an actual behavior of the fuel injection nozzles may not correspond to a desired behavior, e.g. with respect to a timing of an injection and/or an amount of fuel per injection. This may be further emphasized by the fact that the technical properties of an injection nozzle may change during its operational life due to wear and similar.

SUMMARY

According to an aspect of the present disclosure, a method is provided for operating a fuel injection system for a vehicle, where the fuel injection system includes an injection nozzle comprising a nozzle body, a nozzle orifice and a nozzle needle configured to move in the nozzle body.

The method comprises: measuring an actual injection timing of the injection nozzle during injection based on an electrical signal generated by the nozzle needle through an electric contact with the nozzle body so that the electrical signal identifies an open state and a closed state of the injection nozzle; calculating a deviation of the actual injection timing from a scheduled injection timing of the fuel injection system; and controlling the injection nozzle by adjusting injection parameters of the injection nozzle based on the evaluated deviation.

According to another aspect of the present disclosure, a fuel injection system comprises: an injection nozzle which includes a nozzle body with a nozzle orifice at an axial end of the nozzle body and a nozzle needle configured to move within the nozzle body and to open and close the nozzle orifice by contacting the nozzle body at the nozzle orifice, wherein the nozzle needle is configured to generate an electrical signal by forming an electric contact with the nozzle body, the electrical signal configured to identify an open state and a closed state of the injection nozzle; and an injection control devices configured to measure an actual injection timing of the injection nozzle on basis of the generated electrical signal, to evaluate a deviation of the actual injection timing from a scheduled injection timing of the fuel injection system, and to control the injection nozzle by adjusting injection parameters of the injection nozzle based on the evaluated deviation.

According to yet another aspect of the present disclosure, a motor vehicle comprises an internal combustion engine and the fuel injection system, and the injection controller of the fuel injection system comprises and/or is communicatively coupled to an engine control unit of the internal combustion engine.

One form of the present disclosure is to employ a particular injector design to monitor an operating status of a fuel injector, e.g. a diesel injector, in situ and in real time and to utilize the corresponding measurement signal to evaluate whether there is a deviation from a scheduled and/or desired behavior. If the injection system does not behave as desired then counter measures are initiated by adjusting the injection parameters of the injection nozzle in an appropriate way. The outcome of the measurement is particularly applied as feedback by generating a control action, thus providing a closed control loop and/or an adaptive correction procedure.

To this end, the electrical signal is used to measure an actual injection timing of the injection nozzle, which in practice can significantly differ from the desired and/or configured injection timing. For example, an injection valve of the injection nozzle may need to be opened and closed at a precise point in time in order to provide an accurate amount of injected fuel. Imprecise timing of the injection valve may adversely affect the performance of the injection system and thus of the corresponding internal combustion engine. With the system of the present disclosure, the actual timing of the injection nozzle can be precisely measured so that the injection process may be improved in case of deviations.

Among the various benefits of the present disclosure, excellent emission and noise levels may be achieved at various operating conditions and over the whole life cycle of the injection system, while at the same time low vehicle-to-vehicle dispersion can be provided. The present disclosure hence provides a powerful support for on-board diagnostics. Furthermore, vehicle calibration efforts may be lowered significantly, thus saving time and costs.

The fuel injection system may be based on a common-rail direct fuel injection system as it is known for diesel engines. However, the present disclosure may also be employed in other injection systems, for example gasoline direct injection, or reductant injection in after treatment systems (e.g. liquid urea injection valves in selective catalytic reduction devices). The fuel injection system may comprise one or several injection nozzles. Contrary to commonly employed injection nozzles however, the injection nozzle of the present disclosure comprises a nozzle body, a nozzle needle and a nozzle orifice. In particular, the nozzle needle is arranged in the nozzle body. The nozzle needle can be arranged in the nozzle body such that the nozzle needle can be at least partially guided by the nozzle body. The nozzle needle is operative to open and close the injection orifice by contacting the nozzle body at a needle tip at an axial end of the nozzle needle. At the same time, an electrical contact is closed (respectively opened) when the nozzle needle contacts the nozzle body at the axial end of the nozzle needle. In that sense the nozzle needle forms an electrical switch (and thus not only serves as a hydraulic control element), which is closed in the closed state of the injection nozzle and open in the open state of the injection nozzle. Hence, an electrical signal arises that may provide precise and immediate timing information on the opening condition of the nozzle orifice.

To this end, the nozzle body and the nozzle needle may comprise and/or be formed from electrically conducting material. The nozzle body and the nozzle needle may be electrically insulated from each other in an open state of the nozzle orifice. The nozzle needle may for example be separated from then nozzle body in a radial direction by an insulating coating or similar. The nozzle needle may remain uncoated at the axial ends however, in particular at the contacting point(s) with the nozzle body at the nozzle orifice in order to close the electric contact with the nozzle body.

Further, the fuel injection system may comprise a control piston, which may be configured to mechanically and electrically contact the nozzle needle at an axial end in an axial direction opposite to the nozzle orifice. During operation of the fuel injection system, hydraulic forces can be applied to the control piston and the nozzle needle. For example, the injection nozzle may comprise a two-way solenoid or similar valve operative to control an injection fuel pressure acting on the nozzle needle. The corresponding hydraulic forces can be applied on two opposite sides of the fuel injection system. Therefore a reliable functionality of the fuel injection system can be provided. The control piston may be mechanically contacted to the nozzle needle via the hydraulic forces and may also be in electrical contact based on electrically conducting materials of the control piston and the nozzle needle, respectively. The control piston may also be covered by an electrically insulating coating as the nozzle needle.

An adjusting shim may be arranged between the nozzle needle and the control piston. The adjusting shim can be used to compensate tolerances between the nozzle needle and the control piston and to electrically contact the nozzle needle with the control piston. The adjusting shim can be an optional component of the fuel injection system. By using the adjusting shim the fuel injection system can be provided in a cost efficient manner.

The fuel injection system may further comprise a transmitter, which may be configured to communicate with an injection control device and which may be configured to electrically contact the nozzle needle via the control piston. In other words the transmitter may be arranged in a section adjacent to the control piston, wherein the control piston may be configured to in particular electrically connect the transmitter with the nozzle needle. The electrical signal determining the open/closed condition may be transmitted inside the nozzle needle and the control piston from the needle tip through the control piston and from there to the transmitter. The arrangement of control piston and nozzle needle thus forms a stack, which behaves similar to a single metal rod (which is insulated against ground).

The injection control device of the fuel injection system may be configured to determine an open state and a closed state between the nozzle needle and the nozzle body via the electrical signal detected by the transmitter. Or more generally, the injection control device may measure the actual injection timing of the injection nozzle during injection on basis of the electrical signal. The electrical signal can be a time dependent voltage pulse, for example. The injection control device may comprise and/or be coupled to an engine control unit and may further be configured to adjust the open state and the closed state between the nozzle needle and the nozzle body. Amongst others, the transmitter may thus be monitored and processed by the injection control device. The injection control device can be an adapted control logic or individual micro-electronical system integrated in an engine, in particular a diesel combustion engine or a gasoline direction injection engine, of a vehicle. The injection control device can be configured to operate the fuel injection system efficiently. In other words the injection control device can be configured to manage a closed/open loop control and/or an adaptive (feed-forward) control of the fuel injection system via a precise nozzle needle control.

According to another form of the present disclosure, measuring the actual injection timing may comprise measuring an injection start time, an injection end time and/or an injection period. The injection period may correspond to the duration of a single injection, that is the interval between the injection start time and the injection end time.

According to other form of the present disclosure, the method may further comprise calculating an actual injection amount on basis of the measured actual injection timing. A deviation of the actual injection amount from a scheduled injection amount of the fuel injection system is calculated. For a given injection pressure, the injection amount may be calculated, for example, from a measured injection period. Hence, the present disclosure provides the opportunity to control the injection quantity as well as the injection timing, e.g. within a closed control loop or a feed-forward control. Any deviation between detected and demanded injection quantity and injection timing may be monitored and compensated by corresponding control commands. The applied correction parameters and/or adjusted injection parameters may be mapped and stored, e.g. in a non-volatile memory or the like. Hence, respective correction parameters may be utilized even in system conditions, when a closed control loop may not be possible or feasible. An example for such a situation may be a cold start, extreme environmental conditions, general rapid transients, i.e. situations in which a closed control loop would be too slow, too elaborate or insufficient for an effective control.

According to another form of the present disclosure, the injection parameters may comprise valve actuation parameters of an injection valve of the injection nozzle and/or an injection pressure of the injection nozzle. The injection valve may be, for example, an electromagnetic/piezo/electrohydraulic servo valve, a two-way solenoid valve or similar valve as they are used in injection systems.

According to one form of the present disclosure, the method may further comprise monitoring the measured actual injection timing. The method may further comprise storing adaptive correction parameters representing adjustments to the injection parameters in dependence of an operating condition of the fuel injection system. For example, it may not be possible to run a closed control loop based on a measurement of the injection timing and corresponding adjustments to the injection parameters in all operating situations, e.g. engine conditions. In special cases, e.g. strong transients, extreme environmental conditions, cold starts etc., a feed-forward control/open loop control may be advantageous and more effective. In order to provide the best possible metering correction at any time, respective correction parameters may be mapped and stored in a data repository (e.g. a non-volatile memory) and continuously upgraded during monitoring of the injection timing. Correction parameters may even be extrapolated to operating conditions that have not actively been monitored. Hence, the injection may be corrected/controlled by using both adaptive correction in feed-forward modes and closed loop correction in closed control loops. The latter may be limited to normal operating conditions, e.g. in which the engine is warmed up and running.

According to one form of the present disclosure, the method may further comprise applying the adaptive correction parameters in a feed-forward mode of the fuel injection system.

According to another form of the present disclosure, the method may further comprise providing an injection schedule comprising a scheduled injection timing, a scheduled injection amount and/or an injection pattern of consecutive injections. The injection schedule may be provided by an injection control device of the system, e.g. an engine control unit. Besides single injections, the injection schedule may also comprise more complex injection patterns comprising several consecutive injections, which may differ in timing and amount. For example, two small (pilot) injections may be followed by a larger (main) injection (as it is known for diesel vehicles).

According to another form of the present disclosure, the method may further comprise providing an expected opening delay of the injection nozzle, an expected closing delay of the injection nozzle and a predetermined plausibility window respectively around the expected opening delay and the expected opening delay. The method may further comprise determining for each injection if a measured injection start time and a measured injection end time occur within the respective plausibility window. The measured actual injection timing may be discarded in case the measured injection start time or the measured injection end time do not occur within the respective plausibility window.

For example, an expected opening delay and an expected closing delay may be provided by the injection control device and may relate to the delay between the actuation/activation time of a servo valve or similar device and the actual start/end of the injection, i.e. the time when fluid is actually injected. Characteristic opening and closing delays may be known and stored in a data repository of the injection control device. If the measured needle opening/closing fits to the plausibility window, the measurement is considered as plausible (i.e. the deviation from the expected values is not too extreme) and further used for evaluation/calculation and controlling the injection nozzle. If the measured timing features a deviation to the scheduled/expected timing but lies within the window, then the method proceeds by controlling the injection nozzle appropriately to correct for the deviation. The expected opening delay and the expected closing delay may change over the system's lifetime and may be adapted accordingly. In particular, the closing delay may fluctuate strongly depending on various quantities like pressure, temperature, injection duration, engine operating condition, speed-torque characteristic and so on.

The present disclosure will be explained in greater detail with reference to exemplary forms depicted in the drawings as appended.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The accompanying drawings are included to provide a further understanding of the present disclosure. The drawings illustrate exemplary forms of the present disclosure and together with the description serve to explain the principles of the present disclosure. Other forms of the present disclosure and many of the intended advantages of the present disclosure will be readily appreciated as they become better understood by reference to the following detailed description. The elements of the drawings are not necessarily to scale relative to each other.

Figure 1:
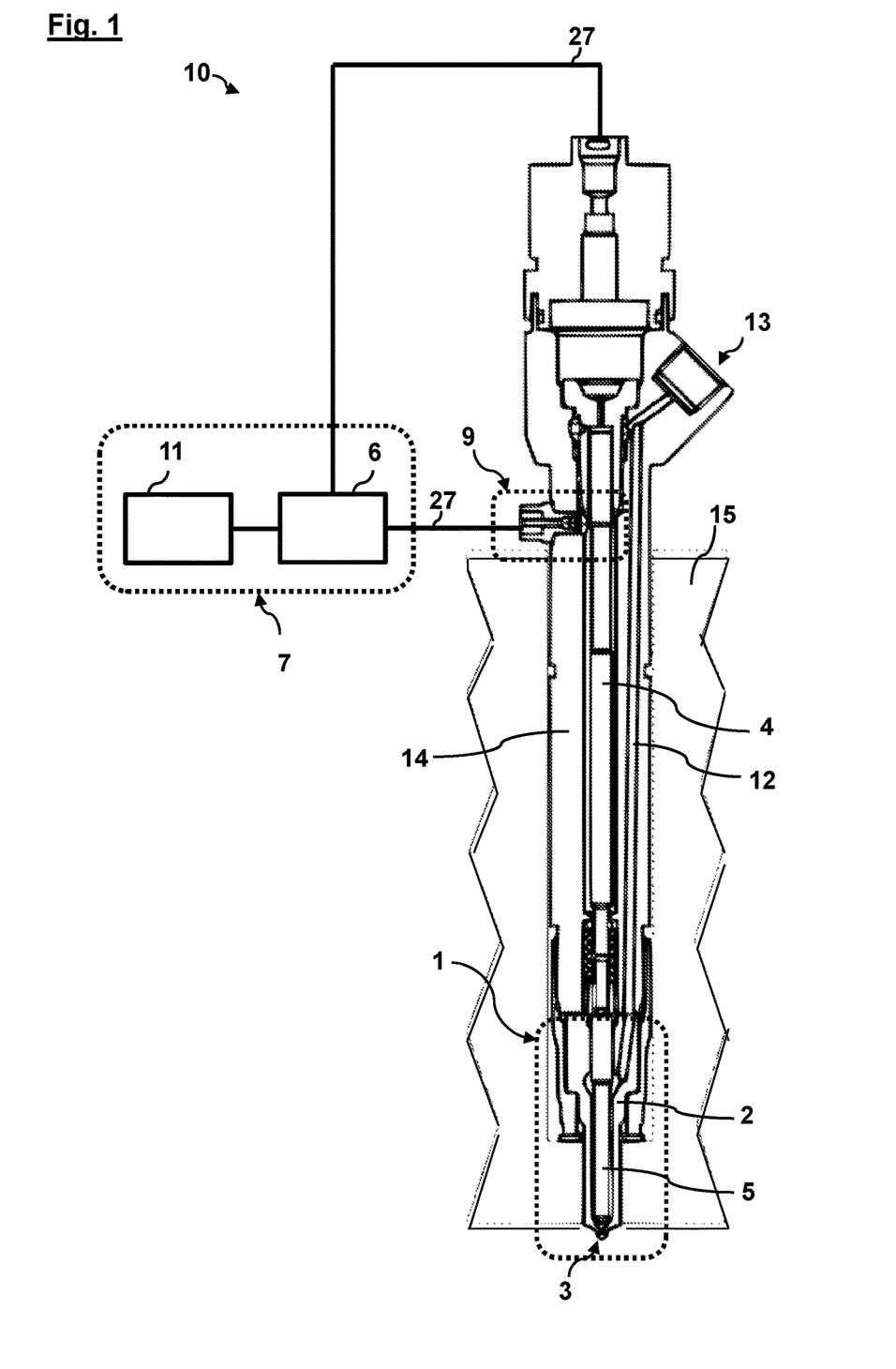
FIG. 1 shows a cross sectional view of a fuel injection system according to one form of the present disclosure.
Figures 2, 3:
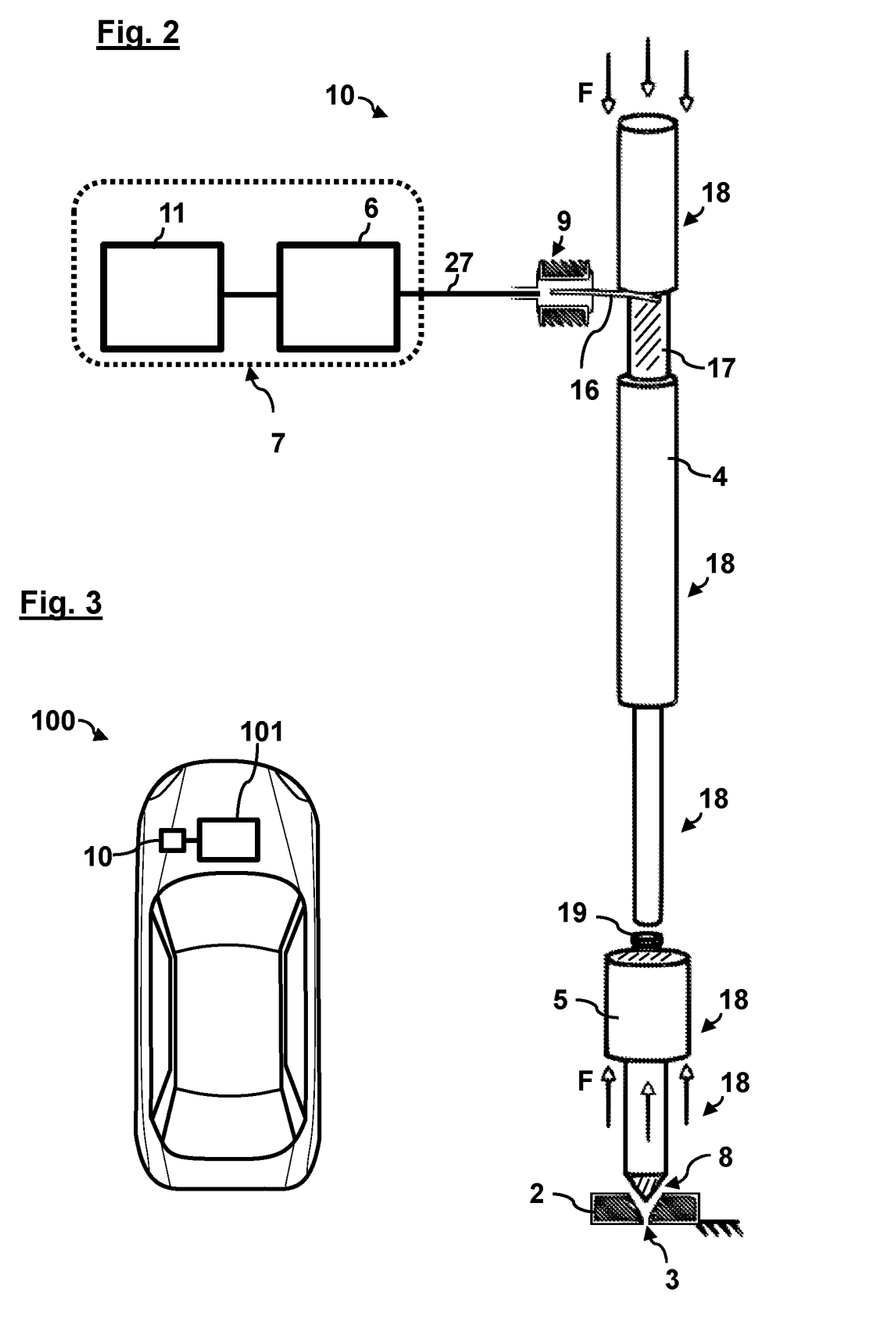
FIG. 2 shows a schematic perspective view of the fuel injection system of FIG. 1.
FIG. 3 schematically shows a motor vehicle comprising the fuel injection system of FIG. 1.

FIG. 1 shows a cross sectional view of a fuel injection system 10 according to one form of the present disclosure. FIG. 2 shows a section of the fuel injection system 10 of FIG. 1 in a perspective view. The fuel injection system 10 may be integrated into a motor vehicle 100 with an internal combustion engine 101, e.g. a diesel engine, as it is exemplarily shown in FIG. 3.

The fuel injection system 10 for fuel metering comprises an injection nozzle 1, which comprises a nozzle body 2, a nozzle needle 5 and a nozzle orifice 3. In particular, the nozzle body 2 is configured to guide the nozzle needle 5 within the nozzle body 2. The fuel injection system 10 further comprises a control piston 4 configured to mechanically and electrically contact the nozzle needle 5 in an axial direction opposite to the nozzle orifice 3. The control piston 4 is arranged in an injector body 14.

The contact between the nozzle needle 5 and the control piston 4 can be maintained based on hydraulic forces F during operation of the fuel injection system 10. The corresponding hydraulic forces F can be applied on two opposite sides of the fuel injection system 10 (cf. FIG. 2).

The fuel injection system 10 further comprises a transmitter 9, which is configured to communicate with an injection control device 7 and which is configured to electrically connect to the nozzle needle 5 via the control piston 4. Hence, the control piston 4 additionally fulfills the function of a conductive bridge. The injection control device 7 of the fuel injection system 10 comprises a signal unit 6 that is communicatively coupled to an engine control unit 11 of the internal combustion engine 101. The signal unit 6 is further coupled to the transmitter 9 as well as the injector components inside the injector body 14. The injection control device 7 is configured to determine an open state P1 and a closed state P2 between the nozzle needle 5 and the nozzle body via an electrical signal detected or determined by the transmitter 9. In addition, the injection control device 7 is configured to adjust the open state P1 and the closed state P2 by regulating a contact time or rather duration between the nozzle needle 5 and the nozzle body 2 in correlation with a fuel injection quantity. To this end, the fuel injection system 10 may comprise a servo valve or the like (not depicted), whose actuation/activation (e.g. actuation parameters) is controlled by the injection control device 7 in order to open and close the injection nozzle 1 and/or to set an injection pressure of the injection nozzle 1.

The fuel injection system 10 is at least partially arranged within a cylinder head 15, and the transmitter 9 is arranged outside the cylinder head 15. The cylinder head 15 can be a part of a corresponding cylinder assembly of the internal combustion engine 101. The fuel injection system 10 comprises a fuel port 13 being connected to a fuel supply (not shown). The fuel port 13 comprises a fuel line 12, which may be connected with a fuel supply pipe (not shown).

FIG. 2 shows an enlarged schematic sectional view of the transmitter 9, the injection control device 7, the control piston 4 and the nozzle needle 5 within the nozzle body 2. An adjusting shim 19 is arranged between the control piston 4 and the nozzle needle 5. The adjusting shim 19 can be used to compensate tolerances between the nozzle needle 5 and the control piston 4. The control piston 4 has a contact area 17, and the transmitter 9 electrically contacts the contact area 17 via a contact element 16. The contact area 17 has a smaller diameter than the adjacent regions of the control piston 4 so that the contact area 17 functions as a transition zone between the different regions of the control piston 4. The transition zone can be used to guide the contact element 16 to its predetermined position at the control piston 4. For example, the contact element 16 may comprises a spring steel and can be a wire.

A radial surface of the nozzle needle 5, the adjusting shim 19 and the control piston 4 are coated with an electrical insulation 18. Only the face ends of the nozzle needle 5 at both axial ends (cf. the hatching in FIG. 2) and the contact area 17 (as well as the axial faces of the adjustment shim 19) are left uncoated to provide an electrical connection between the distal axial end 8 of the nozzle needle 5 and the transmitter 9. When the nozzle needle 5 mechanically contacts the nozzle body 2 at the nozzle orifice 3, an electrical circuit is closed and an electrical signal is generated, which is then sensed and forwarded by the transmitter 9 to the injection control device 7. The electrical signal is then used to control the injection nozzle 1, as will be explained in the following with reference to FIGS. 4-10.

Figure 5:
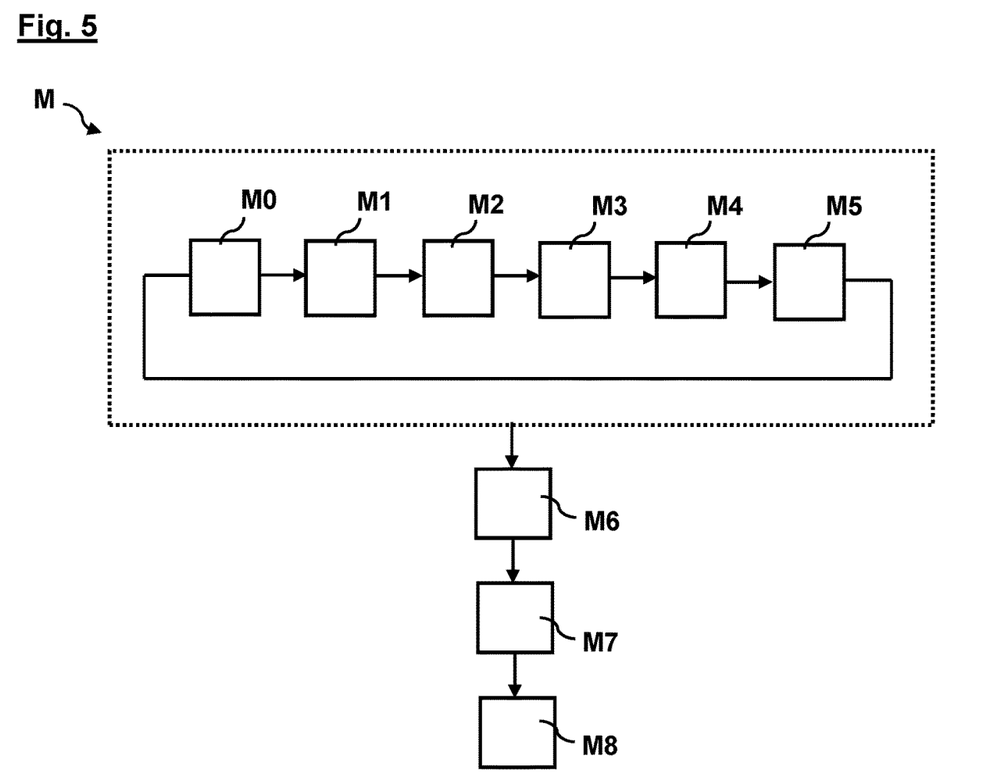
FIG. 5 shows another flow diagram of the method in FIG. 4.

FIG. 5 shows a flow diagram of a method M for operating the fuel injection system 10 of FIG. 1 according to another form of the present disclosure.

The method M comprises under step M0 providing an injection schedule comprising a scheduled injection timing, a scheduled injection amount and/or an injection pattern of consecutive injections. For example, the corresponding information may be read by the signal unit 6 from the engine control unit 11. Each engine calibration has its own individual injection strategy with respect to injection pattern and injection timing as well as injection amount. A clock time of the engine control unit may serve as a basis for an assignment of injection start and end. Besides single injections, the injection schedule may also comprise more complex injection patterns comprising several consecutive injections, which may differ in timing and amount. For example, two small pilot injections may be followed by a larger injection as it is known for diesel engines. The signal unit 6 may in turn forward the electronic signals to the engine control unit 11 for further recognition, processing and evaluation.

Figure 9:
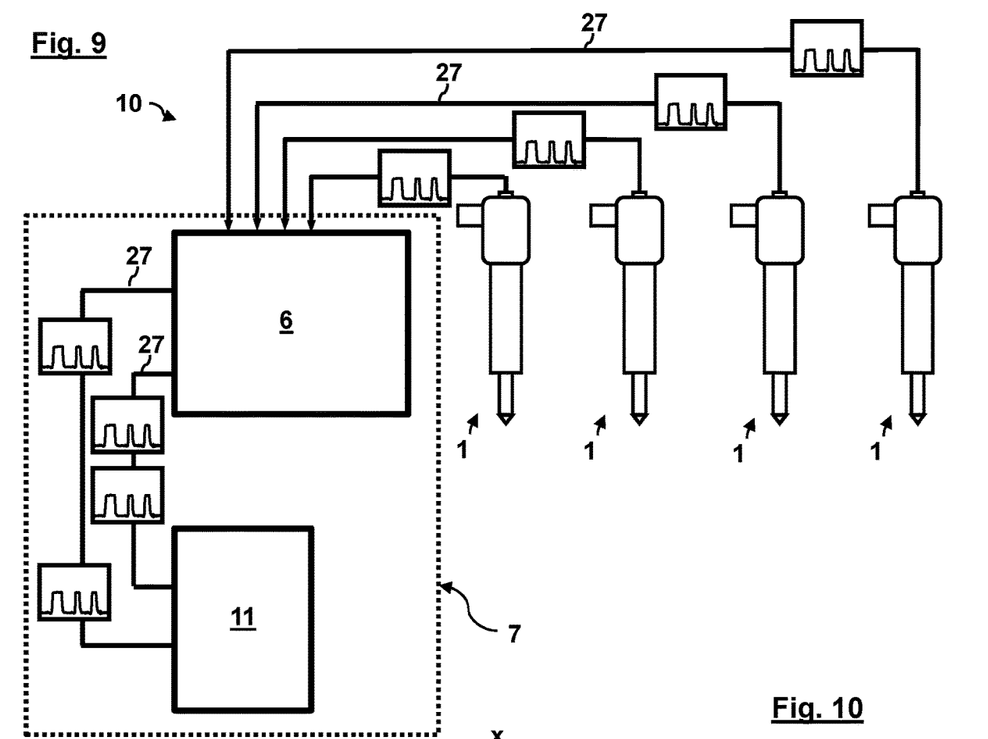
FIG. 9 is another schematic view of the fuel injection system of FIG. 1.

FIG. 9 shows an example, in which several injection nozzles 1 are provided, each of which is connected to the signal unit 6 via a corresponding data/signal line 27, e.g. a wire. The signal unit 6 may be connected to the engine control unit 11 via data/signal lines 27 as well. In the example of FIG. 9, only two data/signal lines 27 are used to connect the signal unit 6 with the engine control unit 11, thus reducing hardware components and simplifying the system. The engine control unit 11 may be configured to evaluate and analyze the electrical signals from the injection nozzles 1. The signal unit 6 may receive the raw (analog) signals and condition them for further processing by the engine control unit 11, e.g. by filtering and/or amplifying the electrical signal.

The method M further comprises under step M1 measuring an actual injection timing of the injection nozzle 1 during injection on basis of the electrical signal. This may comprise, for example, measuring an injection start time, an injection end time and/or an injection period of the injection nozzles 1. To this end, a raw signal 21 may be filtered and amplified to a filtered signal 22 (cf. FIG. 4).

As will be explained now with reference to FIG. 10, the method M further provides under step M0 an expected opening delay OD of the injection nozzle 1, an expected closing CD delay of the injection nozzle 1 and a predetermined plausibility window W respectively around the expected opening delay OD and the expected opening delay CD. These values may be provided by the engine control unit 11, for example, and/or may be stored in a data repository 25 of the fuel injection system 10 (cf. FIG. 4), e.g. in the signal unit 6. Such delays may occur due to various reasons and under various system conditions and may depend on pressure, temperature and so on.

Figure 10:
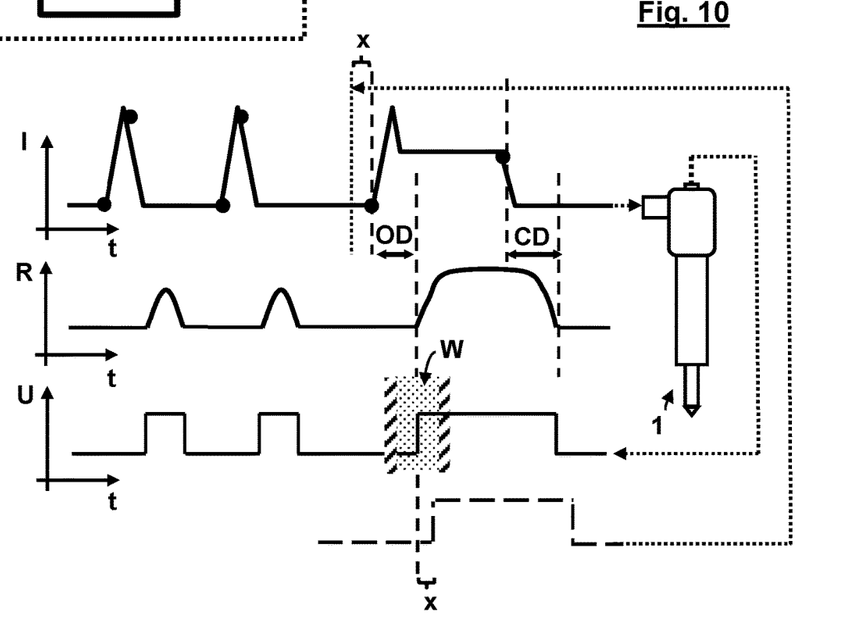
FIG. 10 is another schematic depiction of the method of FIGS. 4-6.

Amongst others, FIG. 10 depicts in the upper row an actuation current I of the injection nozzle 1 as a function of time t. As can be seen, the injection pattern features two short pilot injections followed by a longer main injection. The second row shows the corresponding injection rate R as a function of time, and the area under the corresponding curve represents the injection amount A. As can be seen, there is some delay between the opening as well as the closing of the injection nozzle 1. The last two rows in FIG. 10 demonstrate two exemplary measurements of the electronical signal, which is measured in the form of a voltage pulse U. The upper measurement comes out as expected, that is the voltage pulses start and stop more or less exactly at the expected position in time of the opening delay OD and the closing delay CD (see third row in FIG. 10). However, in case of the second measurement (fourth row in FIG. 10), the voltage pulses are more delayed than expected from the opening delay OD and the closing delay CD, i.e. a deviation x is measured. Hence, the timing of the fuel injection system 10 does not behave as expected. However, as any deviations x can now be measured very precisely, the acquired information can be used to control and correct the fuel injection system 10 in an appropriate way.

The method M further comprises under step M2 determining for each injection if a measured injection start time and a measured injection end time occur within the respective plausibility window W. The measured actual injection timing is discarded in case the measured injection start time or the measured injection end time do not occur within the respective plausibility window W. In that case the measurement is considered to be not plausible as the deviations are too large. Corresponding margins around the plausibility window W, on the basis of which measurements may be rejected or not, are exemplified in FIG. 10 by linear hatched areas around a dotted hatching of the plausibility window W. This procedure may be repeated for each injection event, i.e. pilot as well as main and post injections, for opening as well as closing of the injection nozzles 1. Width and borders of the plausibility window W may be calibrated separately as a function of an operating condition of the fuel injection system 10.

Accordingly, the method M further comprises under step M3 evaluating a deviation of the actual injection timing from a scheduled injection timing of the fuel injection system 10. The method M further comprises under step M4 calculating an actual injection amount on basis of the measured injection timing. Here, a deviation of the actual injection amount from a scheduled injection amount of the fuel injection system 10 may be evaluated. The method M further comprises under M5 controlling the injection nozzle 1 by adjusting injection parameters 23 of the injection nozzle 1 depending on the evaluated deviation. The adjusted injection parameters 23 may comprise amongst others valve actuation parameters of an injection valve of the injection nozzle 1 and an injection pressure of the injection nozzle 1. Hence, the desired corrections may be executed in the form of actuation commands 24 of a valve system of the injection nozzle 1 (see FIG. 4).

Figure 4:
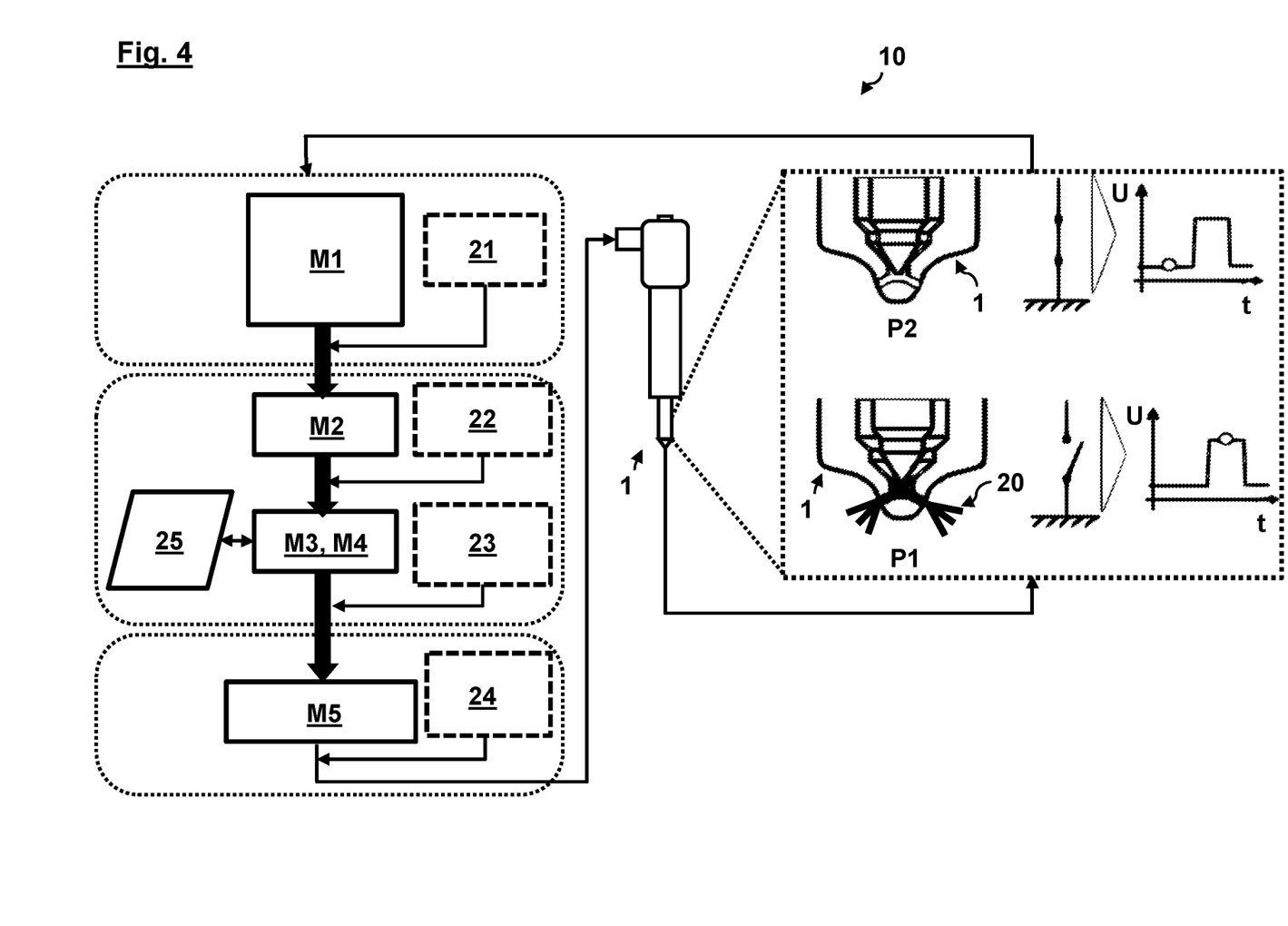
FIG. 4 shows a flow diagram of a method for operating the fuel injection system of FIG. 1 according to one form of the present disclosure.

Hence, as it is shown in FIG. 4, the method M may provide a closed control loop, which enables the injection control device 7 to correct deficiencies and/or discrepancies in injection timing and/or injection quantity. As any deviations are measured in situ and in real time, the shown method M may be utilized to control the fuel injection process in a very precise way.

Figure 6:
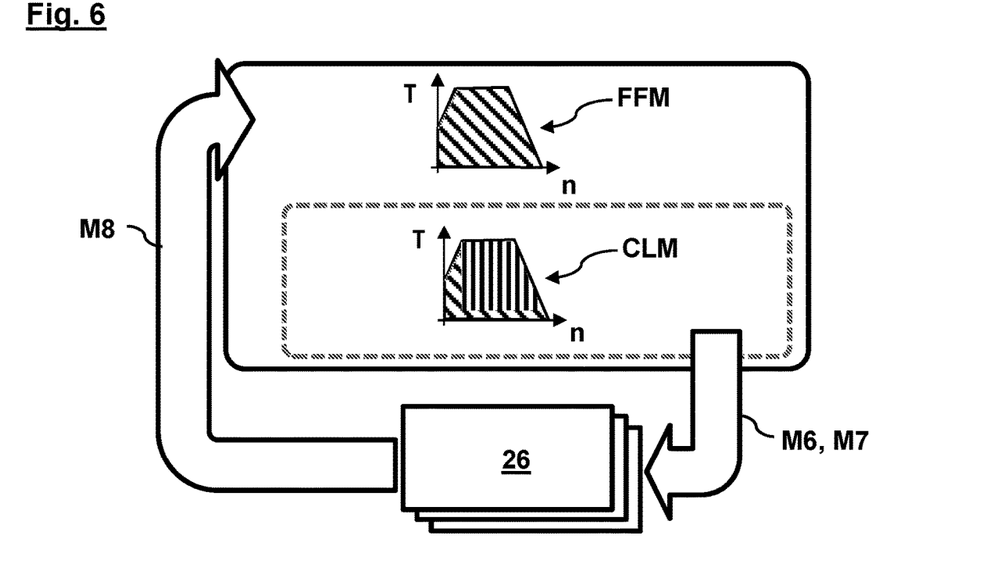
FIG. 6 shows another flow diagram of the method in FIG. 4.

However, such a closed loop control may not be suitable or practical for any driving situation and/or engine condition. In special cases, e.g. rapid transients, a simpler, faster and more robust feed-forward control may be sufficient. In this respect, FIG. 6 depicts the speed-torque characteristic of a typical engine, which maps the torque i against the rotational speed n. The outer box represents the whole operating regime of the corresponding engine, whereas the inner dashed box represents the limited regime of the speed-torque characteristic, in which a closed loop mode CLM may be feasible. A feed forward mode FFM on the other hand may basically be run over the whole operating regime of the engine.

The method M may correspondingly comprise under step M6 monitoring the measured actual injection timing and under step M7 storing adaptive correction parameters 26 representing adjustments to the injection parameters in dependence of an operating condition of the fuel injection system 10 (cf. FIG. 6). For example, the adaptive correction parameters 26 may be stored within the data repository 25 of the fuel injection system 10 as adaptive correction maps. Then, the method M may comprise under M8 applying the adaptive correction parameters 26 in a feed-forward mode FFM of the fuel injection system 10. Thus, the adaptive correction parameters 26 may be stored only when the closed loop mode CLM is activated (e.g. in roughly 70% of the overall operating regime). However, these may be applied in the feed forward mode FFM even when the closed loop mode CLM is not feasible, possible and/or not enabled.

Figure 7:
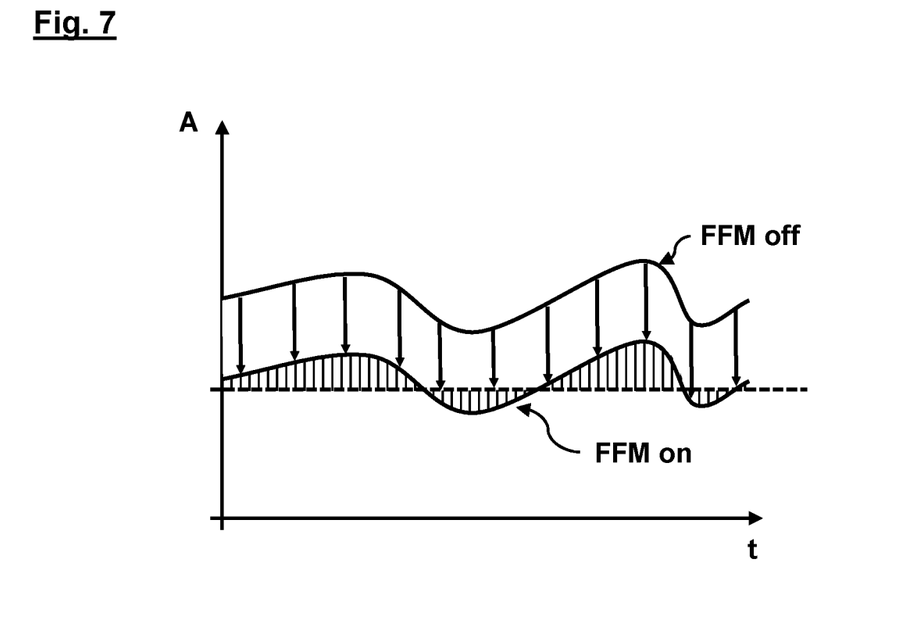
FIG. 7 schematically depicts the result of a system adjustment based on the method of FIGS. 4-6.
Figure 8:
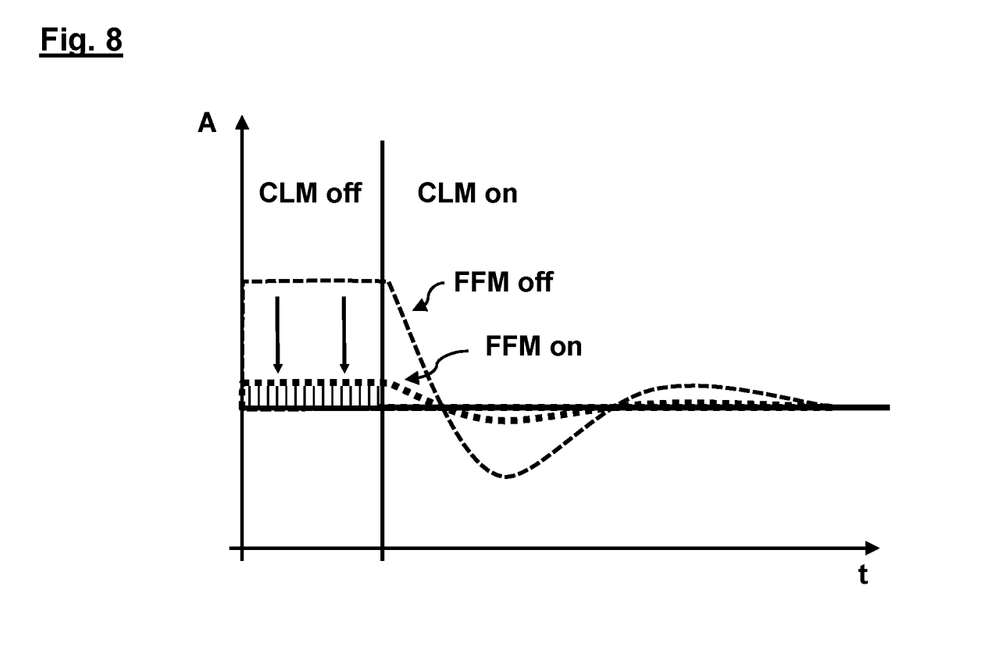
FIG. 8 schematically depicts another result of a system adjustment based on the method of FIGS. 4-6.

FIG. 7 shows an example, in which the adaptive correction parameters 26 are applied within the feed forward mode FFM to bring the injection amount A closer to a set point (dashed line). FIG. 8 shows an example, in which the adaptive correction parameters 26 are first applied (or not applied) within the feed forward mode FFM (CLM off, left in FIG. 8). After enabling the closed loop mode CLM, the injection amount A is quickly converging to the set point. This happens much faster in case that the adaptive correction parameters 26 were applied in the previous feed forward mode FFM.

In sum, the present disclosure provides an improved solution for operating a fuel injection system with reduced emission and noise levels and increased time and cost efficiency.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The forms were chosen and described in order to explain the principles of the present disclosure and its practical applications, to thereby enable others skilled in the art to utilize the present disclosure and various forms with various modifications as are suited to the particular use contemplated. Many other examples will be apparent to one skilled in the art upon reviewing the above specification.

Although specific forms are illustrated and described herein, it will be appreciated by those of ordinary skill in the art that a variety of alternate and/or equivalent implementations may be substituted for the specific forms, without departing from the scope of the present disclosure. Generally, the present disclosure is intended to cover any adaptations or variations of the specific forms discussed herein.

REFERENCE LIST 1 injection nozzle
2 nozzle body
3 nozzle orifice
4 control piston
5 nozzle needle
6 signal unit
7 injection control device
8 axial end
9 transmitter
10 fuel injection system
11 engine control unit
12 fuel line
13 fuel port
14 injector body
15 cylinder head
16 contact element
17 contact area
18 insulation
19 adjusting shim
20 injected fuel
21 raw signal
22 filtered signal
23 adjusted injection parameters 24 actuation commands
25 data repository
26 adaptive correction parameters
27 data/signal line
100 motor vehicle
101 internal combustion engine
F hydraulic force
OD opening delay
CD closing delay
W plausibility window
A injection amount
I actuation current
U signal voltage
R injection rate
t time
τ torque
n rotational speed
x deviation
FFM feed forward mode
CLM closed loop mode
P1 open state
P2 closed state
M method
M0-M8 method steps

What is claimed is:

1. A method for operating a fuel injection system for a vehicle, where the fuel injection system includes an injection nozzle comprising a nozzle body having a nozzle orifice at an axial end of the nozzle body, and a nozzle needle configured to move in the nozzle body and to open and close the nozzle orifice by contacting the nozzle body, the method comprising:
when the nozzle needle physically contacts the nozzle orifice, generating an electrical signal from an electric contact between the nozzle needle and the nozzle body, where the generated electrical signal is configured to identify an open state and a closed state of the injection nozzle;
measuring an actual injection timing of the injection nozzle during injection based on the generated electrical signal;
calculating a deviation by comparing the measured actual injection timing with a scheduled injection timing which is stored in an engine control unit of the fuel injection system, wherein the measured actual injection timing is different from the scheduled injection timing; and
controlling an operation of the injection nozzle by adjusting injection parameters of the injection nozzle based on the calculated deviation, wherein the injection parameters include an injection timing and an amount of fuel injected.

2. The method according to claim 1, wherein measuring the actual injection timing comprises measuring at least one of an injection start time, an injection end time or an injection period.

3. The method according to claim 1, further comprising:
calculating an actual injection amount based on the measured actual injection timing; and
calculating a deviation of the actual injection amount from a scheduled injection amount of the fuel injection system.

4. The method according to claim 1, wherein the injection parameters further comprise at least one of valve actuation parameters of an injection valve of the injection nozzle or an injection pressure of the injection nozzle.

5. The method according to claim 1, further comprising:
monitoring the measured actual injection timing; and
storing adaptive correction parameters representing adjustments to the injection parameters in dependence of an operating condition of the fuel injection system.

6. The method according to claim 5, further comprising:
applying the adaptive correction parameters in a feed-forward mode of the fuel injection system.

7. The method according to claim 1, further comprising:
providing an injection schedule comprising at least one of the scheduled injection timing, a scheduled injection amount or an injection pattern of consecutive injections.

8. The method according to claim 7, further comprising:
providing an expected opening delay (OD) of the injection nozzle, an expected closing (CD) delay of the injection nozzle and a predetermined plausibility window (W) respectively around the expected opening delay (OD) and the expected opening delay (CD).

9. The method according to claim 8, further comprising:
determining for each injection whether a measured injection start time and a measured injection end time occur within the predetermined plausibility window (W), wherein the measured actual injection timing is discarded when the measured injection start time or the measured injection end time do not occur within the predetermined plausibility window (W).

10. A fuel injection system for a motor vehicle, the fuel injection system comprising:
an injection nozzle including:
a nozzle body with a nozzle orifice at an axial end of the nozzle body, and a nozzle needle configured to move within the nozzle body and to open and close the nozzle orifice by contacting the nozzle body at the nozzle orifice, wherein the nozzle needle is configured to form a part of an electric circuit with the nozzle body and generate an electrical signal when the nozzle needle physically contacts the nozzle orifice and forms an electric contact with the nozzle body, the electrical signal configured to identify an open state (P1) and a closed state (P2) of the injection nozzle; and
an injection control device configured to:
measure an actual injection timing of the injection nozzle during injection based on the generated electrical signal;
calculate a deviation by comparing the measured actual injection timing with a scheduled injection timing which is stored in an engine control unit (ECU) of the fuel injection system, wherein the measured actual injection timing is different from the scheduled injection timing; and
control the injection nozzle by adjusting injection parameters of the injection nozzle based on the calculated deviation, wherein the injection parameters include an injection timing and an amount of fuel injected.

11. A motor vehicle with an internal combustion engine and the fuel injection system according to claim 10, wherein the injection control device of the fuel injection system is configured to communicate with an engine control unit of the internal combustion engine.

* * * * *